(No Model.)

H. H. CARPENTER.
SECONDARY BATTERY.

No. 380,989. Patented Apr. 10, 1888.

Witnesses:
Chas. J. Williamson
Henry C. Hazard

Inventor:
H. H. Carpenter
by Prindle and Russell
his Attorneys

UNITED STATES PATENT OFFICE.

HIRAM H. CARPENTER, OF NEW YORK, N. Y.

SECONDARY BATTERY.

SPECIFICATION forming part of Letters Patent No. 380,989, dated April 10, 1888.

Application filed October 8, 1887. Serial No. 251,837. (No model.)

*To all whom it may concern:*

Be it known that I, HIRAM H. CARPENTER, of New York city, in the county of New York, and in the State of New York, have invented certain new and useful Improvements in Secondary Batteries; and I do hereby declare that the following is a full, clear, and exact description thereof, reference being had to the accompanying drawings, in which—

Figure 1:
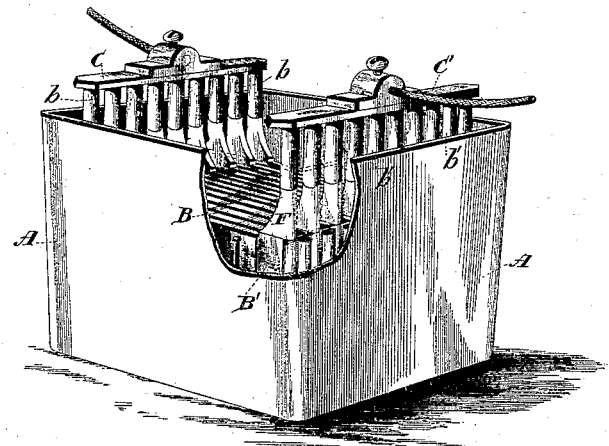
Figure 2:
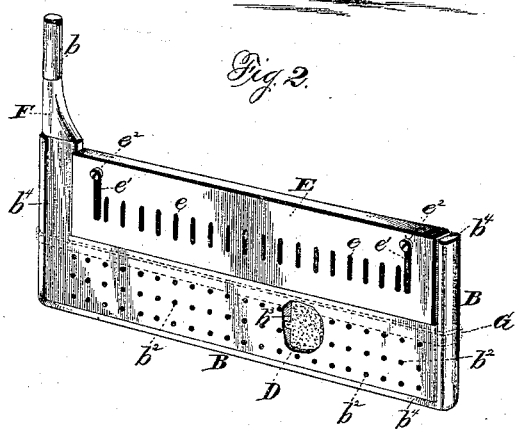
Figure 3:
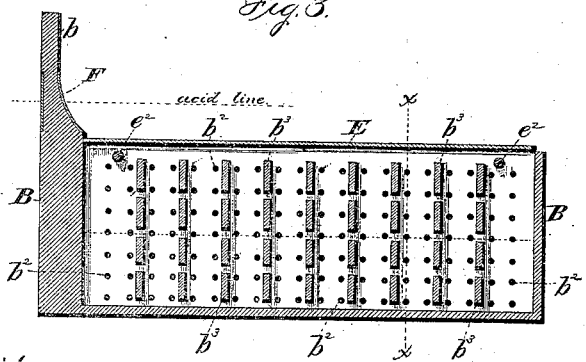
Figure 4:
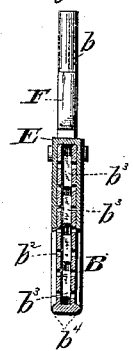

Figure 1 shows a perspective view of my improved battery; Fig. 2, a detail perspective view of one of the plates or electrodes removed from the battery; Fig. 3, a longitudinal vertical section of such plate, and Fig. 4 a transverse vertical section of the same on line $x\ x$ of Fig. 3.

Letters of like name and kind refer to like parts in each of the figures.

The object of my invention is to provide an improved electrical storage or secondary battery; and to this end my invention consists in the battery and in the parts thereof, combined, arranged, and constructed of the materials as hereinafter specified.

In storage-batteries as heretofore made and put on the market the plates or electrodes bearing or holding the active material have been found to deteriorate rapidly when the batteries are used for any length of time. By the action of the acids or electrolytic liquids used the plates have been weakened and their structure has been so changed that they have lost much of their desired conductivity, and have offered considerable hurtful resistance to the passage of the currents through them. Again, where, as heretofore, the active material or substance used has been placed and confined within a hollow plate or electrode, it has been found that the swelling of the active substance, caused by the wetting with the electrolytic liquid when the plate is plunged in the battery, causes buckling and even bursting of the plate. With these objections to the batteries heretofore known in view, I have invented the battery which will be hereinafter described, in which the plates or electrodes are made of material which is a good conductor, and will not be acted upon harmfully or deteriorated by the acid or acids used in the battery, and are so formed to hold the active material that no buckling or breaking can be caused by swelling of such material, and that the exciting or electrolytic liquid can have most free access to the material without danger of washing it out or away from the plate.

There are several novel features in my battery which will be set forth fully hereinafter, and which go together to make a battery much improved in power and durability over any heretofore made.

In the drawings, A designates the box or casing of my battery, and B B and B' B' the positive and negative plates or electrodes, respectively. As is usual, all the positive plates or electrodes are connected together by the bar C of conducting material, preferably metal, and the posts $b\ b$ on the plates in metallic connection with said bar. The latter can be provided with any desired kind of binding-post for attachment of a conductor. The negative electrodes or plates B' B' are provided with posts $b'\ b'$, like those on the positive plates, which are connected together by the conducting-bar C', to be, like bar C, provided with any desired form of binding-post or contact device for the end of a conductor.

Instead of making my plates of lead or alloy of lead and mercury, as has been done heretofore, I use for them a material having greater conductivity, and which is not, like lead or the alloy mentioned, destructively acted upon or deteriorated in any way by the acid or acids used in the electrolytic liquid.

The material which I use for my plates or electrodes is lead containing silver in the proportion of one hundred ounces of silver to the ton of material; but I do not limit myself to such proportions. There can be a less or greater per cent. of silver in the lead, as desired, without departure from my invention.

The silver makes the conductivity of the plate greater than that of a lead or lead and mercury plate, and renders the plate able to withstand the destructive or deteriorating action of the acid or acids in the electrolytic liquid, as plates of lead or of the alloys of lead heretofore used could not. The posts $b\ b$ and $b'\ b'$ and the plate-connecting bars or conductors C C' are all preferably made of the same material as the plates.

The positive and negative plates are made similar in shape and construction, but in the battery are preferably, as shown, turned so that the posts $b\ b$ on the positive plates shall be at one end of casing or box A and the posts $b'\ b'$ on the negative plates at the other end thereof.

Each plate consists of the rectangular body made hollow within for the reception of the active substance or material, D. Through the sides of the plate are series of small holes $b^2\ b^2$, opening into the space within the walls of the plate. Such walls are preferably made, as shown, quite thin, and are supported within by the series of distance pieces or blocks $b^3\ b^3$, which can be cast in one piece with the walls of the plate or soldered or otherwise fixed to them, as desired.

For strengthening and stiffening purposes, where the plate-walls are thin, I form or attach a bead, $b^4$, running around the ends and bottom of the plate.

Over the top of each plate or electrode is a U-shaped cap, E, fitting down over the top, but not so closely as to prevent its rising easily under pressure from within.

The sides of the cap can be perforated with small holes like those in the plate sides, but are preferably provided with a series of narrow slots, $e\ e\ e$, so that as the cap rises or falls the openings $b^2\ b^2$ in the upper portion of the plate will not at any time be closed to prevent access of the electrolytic liquid through them to the active material at the top of the plate-pocket. The cap E is provided, also, with guiding-slots $e'\ e'$, engaging screws or pins $e^2\ e^2$ on the plate. These screws or pins, as also the cap, are best made of the same material as the plate.

With the movable cap on the hollow plate, as described and shown, when the active substance D within the plate is wet with the acid or the electrolytic liquid, and consequently swells up, such swelling does not bulge or buckle the plate or force the active material outward through the perforations $b^2\ b^2$, to be washed away by the liquid in the battery, but simply causes a rising of the cap to accommodate the increase in bulk of the material within the plate.

The cap effectually prevents any of the wet active material from flowing or being washed over the top of the plate.

If desired, the plate sides can be provided with narrow upright slots, like those shown in the cap sides.

For the active material or substance minium or oxide of lead can be used, as heretofore; but I prefer to fill the plates with other material.

In the pocket of each positive plate I put an oxide of lead with a percentage of silver, and in the negative-plate pocket carbonate of lead, also with a percentage of silver. The percentage of silver used in each case is about that given for the silver in the material forming the plates themselves.

The electrolytic liquid used—usually dilute sulphuric acid—should stand at such height within the battery box or casing A as to cover the plates proper, as indicated in Fig. 3.

To prevent any chance of injury to a plate by the action of the sulphate of lead which forms at the top of the liquid, I provide the post or portion of the plate which projects up through the top of the liquid with a band, F, of material adapted to resist the action of the lead sulphate. This band, which is placed so as to extend above and below the acid-level, I can make of non-metallic material; but I prefer to make it of silver, as such metal, even in a thin band, gives perfect protection against the sulphate.

The box or casing A is made of the same material as the plates or electrodes—that is, lead and silver—as such material is capable of resisting any action of the electrolytic liquid and is strong and tough and not liable to breakage.

If desired, the casing can consist of thin walls and bottom of the silver and lead with a wooden or other backing or outside supporting and inclosing casing.

Between the plates or electrodes are to be placed the usual separating-strips, G, of rubber, wood, or other non-conducting material.

If desired, I contemplate providing the casing A within with a band like the protective bands on the electrodes of some material not corrodible by the sulphate of lead at the surface of the electrolytic liquid, but do not consider such protector necessary.

Where the box or casing A is made of metal or the alloy described by me hereinbefore, strips of wood or other non-conducting material will of course be provided to keep the plates or electrodes out of contact with the box-bottom and its sides.

Having thus described my invention, what I claim is—

1. A hollow electrode composed of alloy containing lead and silver and a body of active material within the same, substantially as and for the purpose described.

2. An electrode for secondary or storage batteries, consisting of the hollow metal plate provided within with a series of distance pieces or posts between the walls of the plate, substantially as and for the purpose specified.

3. An electrode for secondary or storage batteries, consisting of the hollow plate with perforated walls, having within distance pieces or posts between the two walls, substantially as and for the purpose shown.

4. A hollow electrode for secondary batteries, adapted to receive the active material within it, having a movable cap covering its top, substantially as and for the purpose set forth.

5. In an electrode for secondary or storage batteries, in combination with the hollow perforated plate, the movable cap covering the top thereof, substantially as and for the purpose specified.

6. In an electrode for secondary batteries, in combination with the hollow perforated receptacle for the active material, the movable cap on such receptacle, having slots to admit the passage of the electrolytic fluid used, substantially as and for the purpose shown.

7. In an electrode for secondary or storage batteries, in combination with the hollow perforated plate, the movable cap provided with a series of slots to admit the electrolytic liquid used, and with guide-slots and screws or pins on the plate sides engaging the guide-slots, substantially as and for the purpose set forth.

8. An electrode for secondary or storage batteries, having a band of silver at the acid-line, substantially as and for the purpose specified.

9. In combination with an electrode of lead and silver, a protecting-band of silver on the electrode at the point to which the acid rises therein when the electrode is placed in the battery, substantially as and for the purpose shown.

10. In a storage or secondary battery, in combination with an electrode for carrying it, the active material composed of carbonate of lead and silver, substantially as and for the purpose shown.

11. In a secondary or storage battery, in combination with a positive electrode provided with active material composed of oxide of lead and silver, a negative electrode provided with active material composed of carbonate of lead and silver, substantially as and for the purpose set forth.

12. In combination with an electrode of lead and silver, a body of active material containing carbonate of lead and silver, substantially as and for the purpose specified.

13. In a secondary or storage battery, in combination with the positive and negative electrodes composed of lead and silver and provided, respectively, with oxide of lead and silver and carbonate of lead and silver as active materials, the electrolytic liquid, substantially as and for the purpose shown.

14. A hollow electrode for secondary or storage batteries, adapted to receive and hold within it the active matter and made telescopic, so as to accommodate itself to any change in the bulk of the active material within it, substantially as set forth.

In testimony that I claim the foregoing I have hereunto set my hand this 5th day of October, A. D. 1887.

HIRAM H. CARPENTER.

Witnesses:
JOHN H. RAND,
GEORGE W. RAND.